United States Patent
Tsai

(10) Patent No.: US 9,868,838 B2
(45) Date of Patent: Jan. 16, 2018

(54) MATERIAL COMPOSITION FOR MAKING EXERCISE MAT AND MANUFACTURING METHOD OF EXERCISE MAT

(71) Applicant: SING PONG INTERNATIONAL CO., LTD., Taipei (TW)

(72) Inventor: Johnny Tsai, Taipei (TW)

(73) Assignee: Sing Pong International Co., Ltd., Taipei (TW)

( * ) Notice: Subject to any disclaimer, the term of this patent is extended or adjusted under 35 U.S.C. 154(b) by 170 days.

(21) Appl. No.: 15/070,855

(22) Filed: Mar. 15, 2016

(65) Prior Publication Data

US 2017/0190861 A1   Jul. 6, 2017

(30) Foreign Application Priority Data

Jan. 4, 2016   (TW) .............................. 105100038 A

(51) Int. Cl.
*C08J 9/10*   (2006.01)

(52) U.S. Cl.
CPC ........... *C08J 9/103* (2013.01); *C08J 2203/04* (2013.01); *C08J 2307/00* (2013.01); *C08J 2327/06* (2013.01)

(58) Field of Classification Search
CPC ... A63B 21/4037; C08J 9/0061; C08J 9/0085; C08J 9/103; C08J 9/105; C08J 2203/04; C08J 2205/06; C08J 2207/00; C08J 2307/00; C08J 2327/06; C08J 2403/02; C08J 2497/02

See application file for complete search history.

(56) References Cited

U.S. PATENT DOCUMENTS

| 8,389,110 | B2 | 3/2013 | Liu | |
| 2007/0198070 | A1* | 8/2007 | Oliveira | A47C 27/15 607/96 |
| 2009/0297811 | A1* | 12/2009 | Hutchinson | A63B 21/4037 428/220 |

FOREIGN PATENT DOCUMENTS

TW   I367234   7/2012

* cited by examiner

*Primary Examiner* — Irina S Zemel
(74) *Attorney, Agent, or Firm* — Muncy, Geissler, Olds & Lowe, P.C.

(57) ABSTRACT

An exercise mat is manufactured by a method including the steps of: mixing 15 wt % to 60 wt % of a plant fiber composite and 40 wt % to 85 wt % of a foamable material to form a mixture; adding an appropriate foaming agent; and foaming the mixture at a predetermined temperature to form a mat. The plant fiber composite includes a plant fiber raw material, a starch assistant and a biopolymer additive containing a plant hormone, an enzyme, a biological vinegar, and lactic acid ester. The foamable material is one selected from polyvinylchloride (PVC) and natural rubber (NR).

22 Claims, No Drawings

MATERIAL COMPOSITION FOR MAKING EXERCISE MAT AND MANUFACTURING METHOD OF EXERCISE MAT

BACKGROUND OF THE INVENTION

1. Technical Field

The present disclosure relates generally to material and manufacturing method of exercise mat and more particularly, to a material composition for making an environmentally friendly, low odor, and recyclable exercise mat and a manufacturing method of the exercise mat.

2. Description of Related Art

Taiwan Patent No. 1367234 (corresponding to U.S. Pat. No. 8,389,110 B2) has disclosed a composition for preparing a plant fiber composite which is non-toxic, harmless, recyclable and low pollution production. Specifically, because rarely utilized waste plant materials such as straw, sugarcane residue, corncob, coconut shell, cereal husk, peanut shell, leaves, bamboo leaves, sawdust, and bamboo stem dust can be used to produce the aforesaid plant fiber composite, the composite has the advantages of environmentally friendly, recyclable, non-toxic, and harmless.

The foregoing composition, however, has never been used in production of exercise mats. In fact, whether the composition can be applied to produce exercise mats is unknown. Accordingly, the inventor of the present disclosure conducted extensive research and experiment on like materials and finally successfully developed the present invention.

BRIEF SUMMARY OF THE INVENTION

An objective of the present disclosure is to provide a material composition for making an exercise mat in which a plant fiber composite and a foamable material are used. Thus, the material composition for making an exercise mat of the present disclosure is environmentally friendly, low odor, and recyclable.

Another objective of the present disclosure is to provide a manufacturing method of exercise mat which is accomplished by mixing a plant fiber composite and a foamable material. As such, the manufacturing method of exercise mat of the present disclosure can produce an environmentally friendly, low odor, and recyclable exercise mat.

To achieve the above-mentioned objectives, a material composition for making an exercise mat according to the present disclosure comprises 15 wt % to 60 wt % of a plant fiber composite and 40 wt % to 85 wt % of a foamable material. The plant fiber composite includes a plant fiber raw material, a starch assistant, and a biopolymer additive containing a plant hormone, an enzyme, a biological vinegar, and lactic acid ester. The foamable material is one selected from polyvinylchloride (PVC) and natural rubber (NR).

Preferably, the plant fiber raw material is selected from the group consisting of straw, sugarcane residue, corncob, coconut shell, cereal husk, peanut shell, leaves, bamboo leaves, sawdust, bamboo stem dust, and a combination thereof.

Preferably, the starch assistant is selected from the group consisting of sweet potato powder, potato powder, corn powder, and a combination thereof.

Preferably, the plant fiber composite is contained in an amount of 15 wt % and the foamable material is contained in an amount of 85 wt %.

Preferably, the plant fiber composite is contained in an amount of 30 wt % and the foamable material is contained in an amount of 70 wt %.

Preferably, the plant fiber composite is contained in an amount of 45 wt % and the foamable material is contained in an amount of 55 wt %.

Preferably, the plant fiber composite is contained in an amount of 60 wt % and the foamable material is contained in an amount of 40 wt %.

Preferably, the plant fiber composite includes the plant fiber raw material, the starch assistant, and the biopolymer additive in a weight ratio of 6:1:3.

Preferably, the plant fiber composite includes the plant fiber raw material, the starch assistant, and the biopolymer additive in a weight ratio of 7:1:2.

Preferably, the biopolymer additive includes a plant hormone, an enzyme, a biological vinegar, and lactic acid ester in a weight ratio of 10:5:2:3.

On the other hand, a manufacturing method of exercise mat according to the present disclosure comprises the steps of: mixing 15 wt % to 60 wt % of a plant fiber composite and 40 wt % to 85 wt % of a foamable material to form a mixture; adding an appropriate foaming agent; and foaming the mixture at a predetermined temperature to form a mat. The plant fiber composite includes a plant fiber raw material, a starch assistant, and a biopolymer additive containing a plant hormone, an enzyme, a biological vinegar, and lactic acid ester. The foamable material is one selected from polyvinylchloride (PVC) and natural rubber (NR).

Preferably, the plant fiber raw material is selected from the group consisting of straw, sugarcane residue, corncob, coconut shell, cereal husk, peanut shell, leaves, bamboo leaves, sawdust, bamboo stem dust, and a combination thereof.

Preferably, the starch assistant is selected from the group consisting of sweet potato powder, potato powder, corn powder, and a combination thereof.

Preferably, the plant fiber composite is contained in an amount of 15 wt % and the foamable material is contained in an amount of 85 wt %.

Preferably, the plant fiber composite is contained in an amount of 30 wt % and the foamable material is contained in an amount of 70 wt %.

Preferably, the plant fiber composite is contained in an amount of 45 wt % and the foamable material is contained in an amount of 55 wt %.

Preferably, the plant fiber composite is contained in an amount of 60 wt % and the foamable material is contained in an amount of 40 wt %.

Preferably, the plant fiber composite includes the plant fiber raw material, the starch assistant, and the biopolymer additive in a weight ratio of 6:1:3.

Preferably, the plant fiber composite includes the plant fiber raw material, the starch assistant, and the biopolymer additive in a weight ratio of 7:1:2.

Preferably, the biopolymer additive includes the plant hormone, the enzyme, the biological vinegar, and lactic acid ester in a weight ratio of 10:5:2:3.

Because the material composition for making an exercise mat of the present disclosure includes a plant fiber composite and a foamable material, the material composition of the present disclosure is environmentally friendly, low odor, and recyclable. In addition, the manufacturing method of exercise mat of the present disclosure can produce an environmentally friendly, low odor and recyclable exercise mat since it is accomplished by mixing a plant fiber composite and a foamable material.

DETAILED DESCRIPTION OF THE INVENTION

The technical features of the present disclosure will be more fully understood from the following description and a preferred embodiment.

A manufacturing method of exercise mat according to a preferred embodiment of the present disclosure comprises the steps as follows.

A mixture is provided by mixing 15 wt % to 60 wt % of a plant fiber composite and 40 wt % to 85 wt % of a foamable material. Then, an appropriate foaming agent is introduced into the mixture. Finally, a foaming process is performed at a predetermined temperature to form a mat. The foaming process can be any one of continuous foaming, injection foaming, and in-mold foaming. The plant fiber composite includes a plant fiber raw material, a starch assistant, and a biopolymer additive containing a plant hormone, an enzyme, a biological vinegar, and lactic acid ester. The foamable material is one of polyvinylchloride (PVC) and natural rubber (NR). The foaming agent can be a foaming agent known in the art, such as azodicarbonamide (ADCA or referred to as AC foaming agent) and 4,4'-oxydibenzenesulfonyl hydrazide (OBSH). The predetermined temperature varies depending on the kind of the foamable material, for example the temperature may be about 180° C. when the foamable material is PVC, or the temperature may be about 150° C. when the foamable material is NR.

In the manufacturing method of the preferred embodiment, the plant fiber raw material is selected from the group consisting of straw, sugarcane residue, corncob, coconut shell, cereal husk, peanut shell, leaves, bamboo leaves, sawdust, bamboo stem dust, and a combination thereof. The starch assistant is selected from the group consisting of sweet potato powder, potato powder, corn powder, and a combination thereof.

In the manufacturing method of the preferred embodiment, the plant fiber composite includes the plant fiber raw material, the starch assistant, and the biopolymer additive in a weight ratio of 6:1:3 or 7:1:2. The aforesaid weight ratios have been already disclosed in Taiwan Patent No. 1367234 and are not the primary technical features of the present disclosure, thus require no further description.

In the manufacturing method of the preferred embodiment, the biopolymer additive includes the plant hormone, the enzyme, the biological vinegar, and the lactic acid ester in a weight ratio of 10:5:2:3. The aforesaid ratio has also been disclosed in Taiwan Patent No. 1367234 and thus requires no further description.

In a first embodiment, the material composition includes 15 wt % of the plant fiber composite and 85 wt % of the foamable material.

In a second embodiment, the material composition includes 30 wt % of the plant fiber composite and 70 wt % of the foamable material.

In a third embodiment, the material composition includes 45 wt % of the plant fiber composite and 55 wt % of the foamable material.

In a fourth embodiment, the material composition includes 60 wt % of the plant fiber composite and 40 wt % of the foamable material.

The material compositions of examples 1 to 8 shown in the following Tables 1 and 2 were used to produce exercise mats through the manufacturing method of the present disclosure. Static and kinetic coefficients of friction of the exercise mats manufactured from examples 1 to 8 were determined by ASTM D1894-11 at a temperature of 23±2° C., a relative humidity of 50±2%, a velocity of 150 mm/min, and a force of 221.83 g on a wooden contact surface. The results are shown in Tables 1 and 2.

TABLE 1

| Example | Plant Fiber Composite (wt %) | Foamable Material (PVC, wt %) | Coefficient of Static Friction | Coefficient of Kinetic Friction |
| --- | --- | --- | --- | --- |
| 1 | 15 | 85 | 0.29 | 0.18 |
| 2 | 30 | 70 | 0.37 | 0.23 |
| 3 | 45 | 55 | 0.45 | 0.26 |
| 4 | 60 | 40 | 0.49 | 0.26 |

It can be known from Table 1 that exercise mats manufactured from examples 1 to 4 possess different static and kinetic coefficients of friction. These exercise mats, therefore, provide different anti-slip effects when laid on the ground for exercise.

TABLE 2

| Example | Plant Fiber Composite (wt %) | Foamable Material (PVC, wt %) | Coefficient of Static Friction | Coefficient of Kinetic Friction |
| --- | --- | --- | --- | --- |
| 5 | 15% | 85% | 1.65 | 1.63 |
| 6 | 30% | 70% | 1.51 | 1.49 |
| 7 | 45% | 55% | 1.59 | 1.57 |
| 8 | 60% | 40% | 1.53 | 1.51 |

It can be known from Table 2 that exercise mats manufactured from examples 5 to 8 possess different static and kinetic coefficients of friction. These exercise mats, therefore, provide different anti-slip effects when laid on the ground for exercise.

Besides, by mixing the plant fiber composite with the foamable material, the intrinsic odor of the foamable material can be reduced. Accordingly, the exercise mat of the present disclosure significantly overcomes the odor issue. It can be expected that the higher the amount of the plant fiber composite, the better the deodorizing effect.

As described above, because the present disclosure provides an exercise mat made by foaming a mixture of a plant fiber composite and a foamable material, the present disclosure is environmentally friendly, low odor, and recyclable.

What is claimed is:

1. A material composition for making an exercise mat, comprising:
   a plant fiber composite in an amount of 15 wt % to 60 wt %, the plant fiber composite including a plant fiber raw material, a starch assistant, and a biopolymer additive, the biopolymer additive including a plant hormone, an enzyme, a biological vinegar, and lactic acid ester; and
   a foamable material in an amount of 40 wt % to 85 wt %, the foamable material being one selected from polyvinylchloride (PVC) and natural rubber (NR).

2. The material composition for making an exercise mat of claim 1, wherein the plant fiber raw material is selected from the group consisting of straw, sugarcane residue, corncob, coconut shell, cereal husk, peanut shell, leaves, bamboo leaves, sawdust, bamboo stem dust, and a combination thereof.

3. The material composition for making an exercise mat of claim 2, wherein the starch assistant is selected from the group consisting of sweet potato powder, potato powder, corn powder, and a combination thereof.

4. The material composition for making an exercise mat of claim 1, wherein the starch assistant is selected from the group consisting of sweet potato powder, potato powder, corn powder, and a combination thereof.

5. The material composition for making an exercise mat of claim 1, wherein the plant fiber composite is in an amount of 15 wt % and the foamable material is in an amount of 85 wt %.

6. The material composition for making an exercise mat of claim 1, wherein the plant fiber composite is in an amount of 30 wt % and the foamable material is in an amount of 70 wt %.

7. The material composition for making an exercise mat of claim 1, wherein the plant fiber composite is in an amount of 45 wt % and the foamable material is in an amount of 55 wt %.

8. The material composition for making an exercise mat of claim 1, wherein the plant fiber composite is in an amount of 60 wt % and the foamable material is in an amount of 40 wt %.

9. The material composition for making an exercise mat of claim 1, wherein the plant fiber raw material, the starch assistant and the biopolymer additive are present in a weight ratio of 6:1:3.

10. The material composition for making an exercise mat of claim 1, wherein the plant fiber raw material, the starch assistant and the biopolymer additive are present in a weight ratio of 7:1:2.

11. The material composition for making an exercise mat of claim 1, wherein the biopolymer additive is composed of the plant hormone, the enzyme, the biological vinegar and the lactic acid ester in a weight ratio of 10:5:2:3.

12. A manufacturing method of exercise mat, comprising the steps of:
mixing 15 wt % to 60 wt % of a plant fiber composite and 40 wt % to 85 wt % of a foamable material to form a mixture;
adding an appropriate foaming agent; and
foaming the mixture at a predetermined temperature to form a mat;
wherein the plant fiber composite includes a plant fiber raw material, a starch assistant, and a biopolymer additive; the biopolymer additive includes a plant hormone, an enzyme, a biological vinegar, and lactic acid ester; and the foamable material is one selected from polyvinylchloride (PVC) and natural rubber (NR).

13. The manufacturing method of exercise mat of claim 12, wherein the plant fiber raw material is selected from the group consisting of straw, sugarcane residue, corncob, coconut shell, cereal husk, peanut shell, leaves, bamboo leaves, sawdust, bamboo stem dust, and a combination thereof.

14. The manufacturing method of exercise mat of claim 13, wherein the starch assistant is selected from the group consisting of sweet potato powder, potato powder, corn powder, and a combination thereof.

15. The manufacturing method of exercise mat of claim 12, wherein the starch assistant is selected from the group consisting of sweet potato powder, potato powder, corn powder, and a combination thereof.

16. The manufacturing method of exercise mat of claim 12, wherein the plant fiber composite is in an amount of 15 wt % and the foamable material is in an amount of 85 wt %.

17. The manufacturing method of exercise mat of claim 12, wherein the plant fiber composite is in an amount of 30 wt % and the foamable material is in an amount of 70 wt %.

18. The manufacturing method of exercise mat of claim 12, wherein the plant fiber composite is in an amount of 45 wt % and the foamable material is in an amount of 55 wt %.

19. The manufacturing method of exercise mat of claim 12, wherein the plant fiber composite is in an amount of 60 wt % and the foamable material is in an amount of 40 wt %.

20. The manufacturing method of exercise mat of claim 12, wherein the plant fiber raw material, the starch assistant, and the biopolymer additive are present in a weight ratio of 6:1:3.

21. The manufacturing method of exercise mat of claim 12, wherein the plant fiber raw material, the starch assistant, and the biopolymer additive are present in a weight ratio of 7:1:2.

22. The manufacturing method of exercise mat of claim 12, wherein the biopolymer additive is composed of the plant hormone, the enzyme, the biological vinegar, and the lactic acid ester in a weight ratio of 10:5:2:3.

* * * * *